Jan. 12, 1926.  1,569,338
G. W. ROSS
BRAKE MECHANISM
Filed Jan. 27, 1923   2 Sheets-Sheet 1
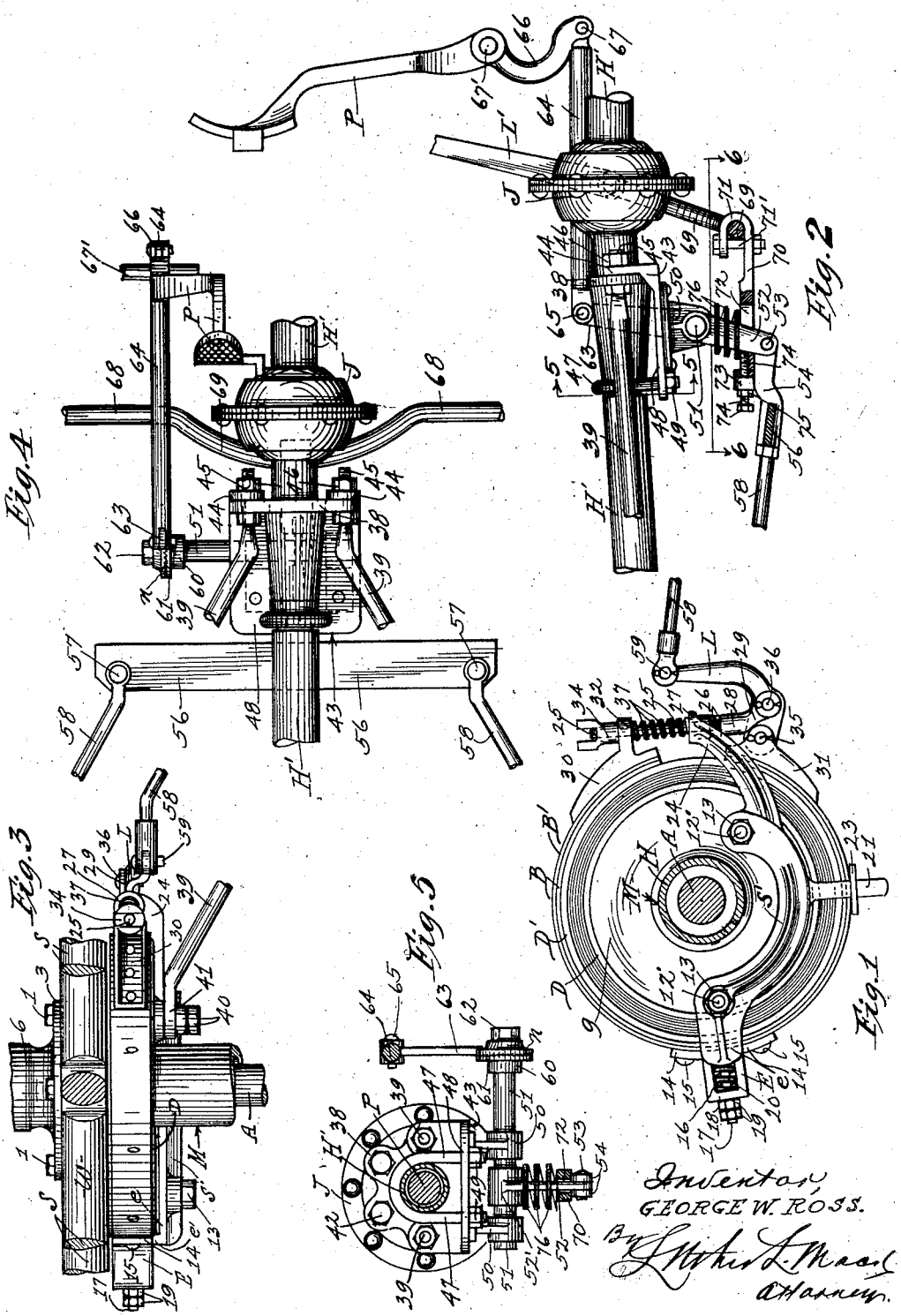
Inventor,
GEORGE W. ROSS.

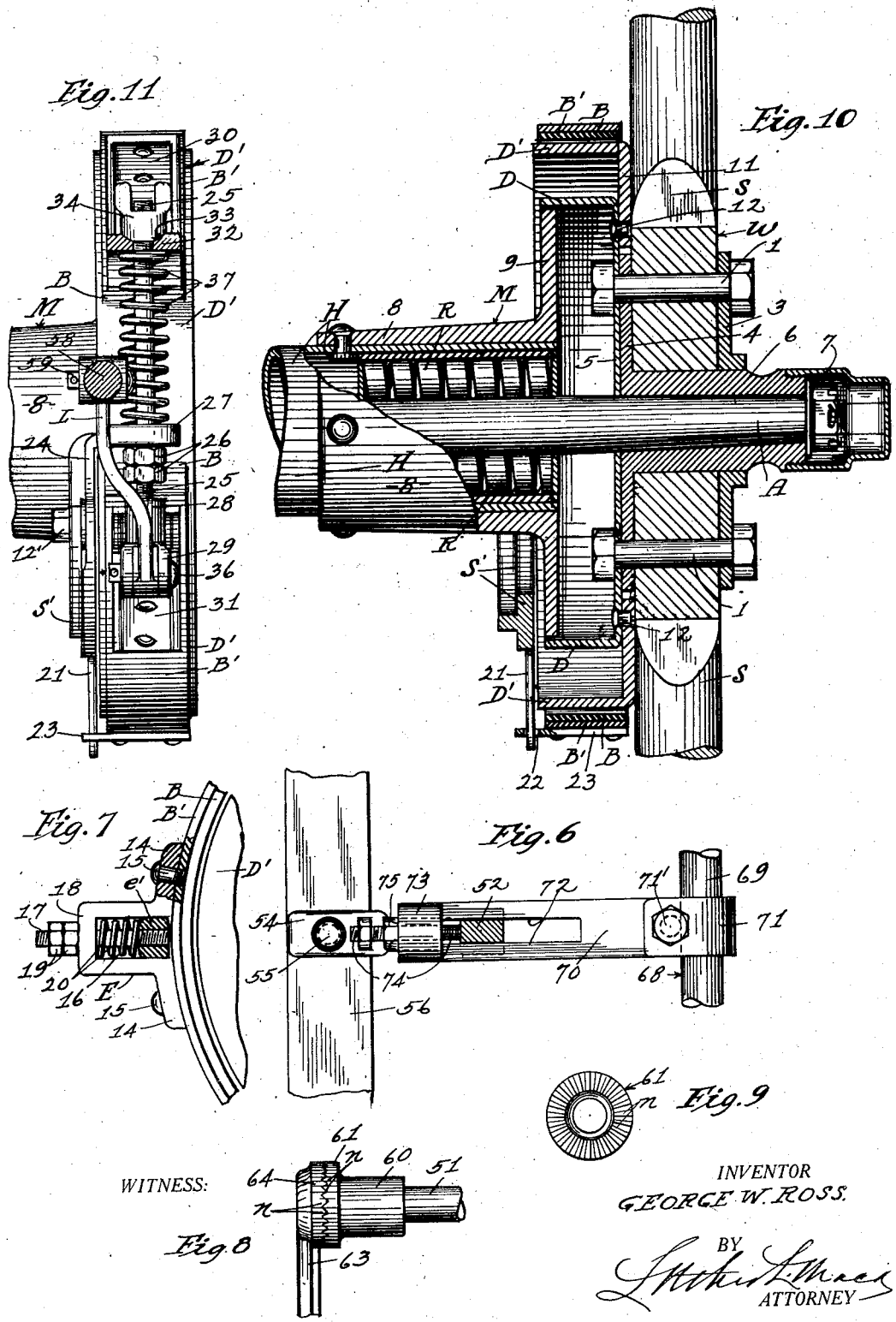

Patented Jan. 12, 1926.

1,569,338

UNITED STATES PATENT OFFICE.

GEORGE W. ROSS, OF HUNTINGTON PARK, CALIFORNIA, ASSIGNOR TO F. L. HETZEL AND A. H. HETZEL, BOTH OF LOS ANGELES, CALIFORNIA.

BRAKE MECHANISM.

Application filed January 27, 1923. Serial No. 615,367.

*To all whom it may concern:*

Be it known that I, GEORGE W. ROSS, a citizen of the United States, and a resident of Huntington Park, in the county of Los Angeles and State of California, have invented new and useful Improvements in Brake Mechanisms, of which the following is a specification.

This invention relates to and has for a main object the provision of an improved type of brake mechanism particularly adapted for use in light touring cars and trucks, where the standard brake equipment of the cars is not adequate and efficient.

Another object is to provide an improved brake mechanism including drums attachable to the wheels of light cars, and of substantially larger diameter than the standard brake drums provided on such cars, which are supplemental to the usual brake drums and are adapted to be installed on the cars without necessitating the removal of the usual brakes, thus providing greater efficiency and a substantially increased braking power than is possible with the standard brakes.

A still further object is to provide a brake mechanism including both emergency and service brake operating means, and brake drums of substantial diameter and width providing increased braking power, connected together centrally of the car and independently connected with emergency and service brake levers whereby the brakes may be applied by foot power, as in the usual service brake methods, and may be permanently set by the usual emergency brake lever.

Another object is to provide a brake mechanism including an equalizer to which the brake drums are connected, and means for adjustably connecting the brake operating members with the equalizer whereby all lost motion may be eliminated and the brakes accurately adjusted for providing a maximum efficiency.

Other objects will appear as the description progresses.

I have shown one practical embodiment of my invention in the accompanying drawings, in which:

Fig. 1 is a sectional elevation of the rear axle housing of an automobile, showing an inside view of one of the brake drums and operating mechanism therefor.

Fig. 2 is a side elvation of the brake operating mechanism at the front of an automobile.

Fig. 3 is a plan view of the mechainsm shown in Fig. 1.

Fig. 4 is a plan view of the mechanism shown in Fig. 2.

Fig. 5 is a transverse section of the mechanism shown in Fig. 2, on line 5—5 thereof.

Fig. 6 is a plan view of the equalizer connection as seen from line 6—6 of Fig. 2.

Fig. 7 is a fragmentary enlarged view of the brake band anchor, shown in Fig. 1.

Fig. 8 is a fragmentary view of an adjustable connection between the brake operating levers typical of my invention.

Fig. 9 is a face view of one of the members shown in Fig. 8.

Fig. 10 is an enlarged transverse section of one of the brake drums, wheel and axle housing; and Fig. 11 is a front elevation of a portion of the same.

Referring particularly to Figs. 10 and 11, I have shown the usual brake drums D attached to the spokes S of the wheel W by means of a plurality of bolts 1, 1, etc., which extend through an outer flange 3 and an inner flange 4 of the wheel W, and also through the web 5 of the usual drum D, and thus serve to hold the drum D in fixed position on the wheel W. The inner flange 4 has a hub 6 which extends through the flange 3 and outwardly from the wheel W, and carries a cap 7 threaded onto the end thereof.

Said hub is adapted to be keyed or otherwise fixed to the rear axle A of the vehicle, and the said axle is enclosed by the usual housing H and has roller bearings R, R, internally of the housing. The outer ends of the axle housing H carry the usual brake supporting members M which have hubs 8 riveted to the housing H, and flanges 9 which form closures for the inner sides of the drum D. On cars of the type shown in the drawings, the standard brakes are of the internal expanding type, the mechanism thereof being eliminated from the disclosure in Fig. 10.

It will be understood that the aforenamed elements are not material to my invention and constitute a standard type of construction for automobiles now in vogue, however, the drums D are usually of small diameter and width and do not provide ample braking surface so as to render the brakes efficient, and in order to overcome this difficulty I provide drums D' which are adapted to be attached to the wheels W and which overlie and are concentrically mounted with respect to the standard drums D. Supplemental drums D' have webs 11 which are riveted at 12, 12 etc., to the webs 5 of the usual drums D and are thus fixed to and for rotation with the wheels W.

On the exterior of the drums D' I provide the usual frictional brake bands B which are attached in the ordinary manner to the metal brake bands B' which almost surround the drums D', the ends of the bands B and B' being substantially spaced apart on the front face of the drums D'.

Each of the drums D' has a supporting member S' in the form of a curved arm which is adapted to be stationarily held on the flange 9 of member M by means of bolts 12', 12' having nuts 13, 13 on the ends thereof, as shown in Figs. 1, 3, 10 and 11.

The members S' have extensions e which project rearwardly from the rearmost bolt 12' and continue at right angles as at e' (Fig. 7) so as to overlie the brake bands B'. The metal bands B' are provided at a point centrally of their ends and rearwardly of the axle housing H with anchor straps E, and the ends 14, 14, of the members E are attached to the bands B' by means of screws or rivets 15, 15, etc.

The members E have rearwardly extended openings 16 formed thereon which receive the transversely disposed portions e' of the supporting members S' and members E and and S' are adjustably connected together by means of bolts 17 which are attached to the ends e' of members S' at their inner ends, and the outer ends of said bolts extend through the portions 18 of the members E and carry a pair of nuts 19, 19, while the central portions of the bolts 17 between the outer face of portions e' of members S' and the inner side of portion 18 of member E carry springs 20 which serve to resiliently hold the brake band B' in adjusted position relative to the drum D'.

The members S' are also provided with depending arms 21 which extend through apertures 22 formed in straps 23 attached to the lowermost portion of the bands B', as shown in Fig. 10, thus serving to hold the band B' in operating position on the drums D'. The members S' also have outwardly and upwardly curved arms 24 formed integrally therewith which slidably receive and hold adjusting rods 25 having pairs of nuts 26, 26, threaded thereon below the end 27 of the arms 24, and the lowermost end of each rod is threaded into a socket 28 of a clevis 29.

The ends of the bands B' are riveted or otherwise attached to members 30 and 31 respectively, and the members 30 have extensions 32 with concave depressions 33 (shown in Fig. 11) formed in the upper sides thereof. The adjusting rods 25 are adapted to extend at their upper ends through bores in the extensions 32 of members 30 and receive adjusting nuts 34 above said extensions 32 which have convex portions on their lower ends conforming to the concave depressions 33 in the extensions 32, so that when the nuts 34 are adjusted, they will be held in adjusted position until otherwise adjusted to a further extent.

The members 31 which are attached to the lower ends of the bands B' are pivotally connected at 35 (as shown in Fig. 1) with brake operating levers L and said levers are connected at 36 and forwardly of members 31, with the lower ends of the clevises 29, so that when the levers L are pulled forwardly, the ends of the band B' will be drawn together by means of the connection described.

The adjusting rods 25 on each of the brake drums carries a coiled spring 37 which is adapted to compress between the portion 32 of member 30, and the portion 27 of arm 24 when the lever L is operated, and the tension of said spring serves to restore the band B' to normally expanded position.

Now, it will be understood that the propeller shaft of an automobile is usually, if not always, disposed in a longitudinal plane centrally between the sides of the car, and said propeller shaft is enclosed by means of a housing H' (Fig. 4) and is connected with the rear axle A by means of a universal joint such as is shown at J in Fig. 2, while the front end thereof is connected with the crank shaft of the engine by means of a similar joint J.

In the particular type of car shown in the drawings the housing H' has a flange 38 formed thereon at the rear of the forward joint J, to which is connected a pair of brace or tie rods 39, 39, on opposite sides of the housing H', and said rods extend rearwardly in a diagonal plane and are attached to and substantially held on the flanges 9 of member M (shown in Fig. 3) by means of bolts 40 extending through the end portions 41 of said rods.

The flange 38 on the housing H' is of the character shown in Fig. 5, and has a plurality of bolts 42—4 in number—which serve to hold the abutting portions of the housing H' together, and the rods 39, 39 are extended through the flange 38 on the horizontal center line of the propeller shaft P in lieu of two of said bolts.

Now, in order to provide a suitable means for connecting my improved mechanism with the brake drums hereinbefore described, I provide a bracket 43 which has a pair of spaced lugs 44, 44, adapted to be attached to the threaded ends 45, 45 of the rods 39, 39 and held thereon by means of nuts 46, 46, thus securely supporting one end of said bracket on the housing flange 38. The rear end of said bracket is additionally supported on the housing H by means of a U bolt 47 which has its ends extending through the bottom 48 of the bracket 43 and held thereon by means of nuts 49.

On the bottom of the bracket 43 I provide a pair of spaced bearings 50, 50 which are riveted or bolted to the bottom 40 of the bracket, and are adapted to hold a short transverse shaft 51. In the exact center of the car and immediately below the propeller shaft housing H', I provide an arm 52 which is fixed to the transverse shaft 51 and extends substantially downwardly therefrom. The lower end of said arm is pivoted at 53 to the forward end of a link 54, and the rear end of said link is pivoted at 55 to an equalizer bar 56 which is held in the slotted end of the link, as shown in Fig. 6.

The bar 56 extends transversely of the housing H' and is pivoted to the link 54 at points equi-distant from its ends, while the ends of said bar are pivoted at 57, 57 to connecting rods 58, 58 which extend rearwardly to and are connected with the upper ends of levers L, L, respectively, by means of bolts or pins 59.

The shaft 51 which is held on bracket 43 is substantially extended from the bracket to the left, as shown in Fig. 5, and carries a collar 60 which is fixed to said shaft and has a flange 61, as shown in Figs. 8 and 9, the outer face of which is provided with a series of radially formed notches as at $n$. The end of the shaft 51 is threaded and receives a nut 62 and loosely carries an upwardly extended arm 63 which has a hub 64 thereon also notched, as at $n$, to correspond to the notches of the flange 61, so that when the nut 62 is loosened the members 60 and 63 may be adjusted for determining the proper operating position of the arm 63, and thereafter when the nut 62 is tightened and the arm 63 properly adjusted, said arm will be held in adjusted position by means of the teeth on one of the members seating in the notches on the adjacent member.

The arm 63 of shaft 51 is connected with the usual brake pedal P by means of a connecting rod 64 which is pivotally connected to the upper end of arm 63 at 65 and is pivoted on a depending arm 66 of pedal P at 67, and the pedal P is mounted on a short transverse shaft 67' usually journaled on the transmission housing of the motor. I may also employ an adjustable joint between the arms 66 and the pedal P on shaft 67' of the character shown in Figs. 8 and 9, if it is found desirable, for obtaining an accurate adjustment of the operating parts thereof, but it is deemed that the joint between the members 60 and 63 on shaft 51 will usually afford ample adjustment.

On certain types of vehicles, a transverse shaft 68 is provided which has a centrally curved portion 69 extending downwardly under the forward propeller shaft joint J, and to one end of the shaft 68 an emergency lever L' is usually attached, while the standard brake drums D, D on the wheels W, W are connected with the shaft 68 at unequal distances from the housing H'.

Now, in order to provide a more satisfactory means of connecting the brake drums with the emergency lever L', I provide an adjustable connection between the curved portion 69 of shaft 68 and the depending arm 52 which is connected with the equalizer bar 56, as shown in Figs. 2 and 6. This connection embodies a member 70 which has its forward end 71 formed into a U and embracing the curved portion 69 of the emergency rod 68, and the opposite legs of the U are connected by means of a bolt 71' which holds the member 70 firmly in position on the rod 68. The central portion of member 70 has an elongated opening 72 therethrough which adjustably receives the arm 52 attached to shaft 51, and the rear end of member 70 has a boss 73 thereon through which an adjusting screw 74 is threaded and adapted to be locked in adjusted position by means of a nut 75 so that the forward end of said screw will engage the rear edge of the arm 52 as shown in Fig. 2.

The arm 52 carries a spring 76 which is coiled therearound and adapted to compress between the upper side of member 70 and hub 52' of the arm 52 as shown in Fig. 5, so as to resiliently hold the rear end of member 70 downwardly in the direction of the lower end of the arm 52.

Now, it will be observed from the foregoing description of my improved device that the connections between the pair of brake drums D', D' and the pedal P and lever L' at the front of the car are made in the exact center of the car, below the propeller shaft housing H', and the equalizer bar 56 is interposed between the drums and operating members so that the strain on the rods 56, 56 will be equalized when the brakes are operated by either the service pedal P or the emergency lever L'.

Furthermore, the connections with the operating members being below the housing H', obviates any noise due to the contact of the rods with other parts of the machine during the movement of the car. After the brakes are adjusted properly and installed on the wheels W, W and the brakes are set at the rear of the car and connected with the rear of the pedals, the equalizer pedals may be nicely adjusted so as to take up all lost motion in the pedals by means of the adjusting screw 74 of member 70, and also by means of the adjustable joint between the members 60 and 63 on shaft 51 so that there will be no lost motion between the operating members and the brakes. Also, the pull on the brakes is at all times centrally of the car, due to the connections shown.

The arrangement of the mechanism shown and described is such that a maximum throw of the pull rods is provided, thereby providing a maximum braking effort at each operation of the pedal P or the lever L', and altogether a more satisfactory braking system is provided than in the standard brakes usually supplied with the car.

It is to be further noted that the character of the brake drums and the operating mechanism thereof is such that the entire mechanism may be readily and quickly installed on a car without necessitating the removal of the usual internal brakes housed within the drums D, D, and without necessitating the provision of new tie rods.

It is to be noted also that when the larger and more efficient brakes of my present invention are installed on a car of the type shown and described, the additional brakes may be utilized for both service and emergency brakes, thus increasing the efficiency of both the service and emergency brakes.

It will be quite obvious to those skilled in the art that I have provided distinct improvements particularly adapted for use on light cars where the brakes are not efficient and are undersize, and that while I have described and shown much that is old in the art for the purpose of clearly explaining my invention, the particular features are embodied in the operating mechanism for the brakes, as clearly shown in Figs. 2, 4 and 5.

It is conceived to be possible to modify or alter my invention within the scope of the appended claims without departing from the spirit thereof.

What I claim is:

1. A brake mechanism including a plurality of brakes, an equalizer bar transversely disposed forwardly of said brakes, separate connections between said equalizer bar and said brakes connected at points equi-distant from the longitudinal axis of the vehicle, adjustable devices connected with said equalizer bar disposed in the plane of the longitudinal axis of the vehicle, and separate hand and foot levers independently and adjustably connected therewith for selectively operating said brakes by either of said levers at will.

2. In a brake mechanism independently mounted hand and foot operating devices, and connecting means including a member pivotally connected with said hand operating device, an arm connected with said foot operated device extending through said member and adapted for operable connection with a brake mechanism, whereby either of said hand and foot operated devices may be employed for operating the brakes.

3. In a brake mechanism independently mounted hand and foot operating devices, and connecting means including a member pivotally conected with said hand operating device, an arm connected with said foot operated device extending through said member and adapted for operable connection with a brake mechanism, whereby either of said hand and foot operated devices may be employed for operating the brakes, the connection between said hand and foot operated devices being adjustable for accurately fixing the extent of the movement thereof.

4. In a brake mechanism a foot operated lever having an axis disposed transversely of the vehicle, a counter shaft paralleling the axis thereof, an arm on said shaft pivotally connected with said lever and adjustably connected with said shaft, a hand operated lever, a shaft therefor paralleling said other shaft, an arm on said first mentioned shaft, a link connecting the shaft of said hand operated lever with said last mentioned arm, means for adjustably connecting said link with said arm, and a brake mechanism connected with said arm and adapted to be operated selectively by either of said levers at will.

5. In a brake mechanism a foot operated lever having an axis disposed transversely of the vehicle, a counter shaft paralleling the axis thereof, an arm on said shaft pivotally connected with said lever and adjustably connected with said shaft, a hand operated lever, a shaft therefor paralleling said other shaft, an arm on said first mentioned shaft, a link connecting the shaft of said hand operated lever with said last mentioned arm, means for adjustably connecting said link with said arm, a brake mechanism connected with said arm and adapted to be operated selectively by either of said levers at will, and means interposed between said first mentioned shaft and said link for resiliently holding said link in operative position.

GEORGE W. ROSS.